July 27, 1965   J. N. WILSON ETAL   3,196,995
FASTENING DEVICE FOR MISSILE COMPONENTS
Filed Jan. 16, 1963   3 Sheets-Sheet 1

James N. Wilson
Edwin Y. Chow,
INVENTORS.

James N. Wilson
Edwin Y. Chow,
INVENTORS.

July 27, 1965   J. N. WILSON ETAL   3,196,995
FASTENING DEVICE FOR MISSILE COMPONENTS
Filed Jan. 16, 1963                       3 Sheets-Sheet 3

James N. Wilson
Edwin Y. Chow,
INVENTORS.

United States Patent Office 3,196,995
Patented July 27, 1965

3,196,995
FASTENING DEVICE FOR MISSILE COMPONENTS
James N. Wilson, Pasadena, and Edwin Y. Chow, Los Angeles, Calif., assignors, by mesne assignments, to the United States of America as represented by the Secretary of the Army
Filed Jan. 16, 1963, Ser. No. 251,990
4 Claims. (Cl. 189—36)

This invention relates to an improvement for securing major components of structures such as sections of a missile.

In the past it has been necessary to utilize complicated and expensive fastening devices which often times were slow and cumbersome to manipulate. These fasteners often required a large selection of special tools for their operation. In fasteners for use on missiles, aircraft and the like it is necessary that the bulk of the fastener be located within the outer shell of the missile and yet be operable from the exterior thereof. In this respect the previous fastening devices have been unsatisfactory. Previous fasteners have also necessarily been built to close engaging tolerances thus requiring precise alignment of the components to be connected.

In view of these facts, one object of this invention is to present an inexpensive and easily operable fastening device.

Another object is to provide a fastener which may be manipulated with a minimum of equipment.

A further object is to provide a fastener which is located within the missile yet operable from the exterior thereof.

Another object is to provide a fastener having a convenient guide means for alignment of the components to be attached, thus eliminating the need for exact positioning of the components being connected.

The simplicity and ruggedness of this fastener gives it the ideal characteristics needed for arctic missile operations. The lack of loose parts and the need for only one large wrench to make or break the joint make it possible to accomplish this operation in a very short time.

A better understanding of the invention will be had by referring to the drawings, in which.

Figure 3:
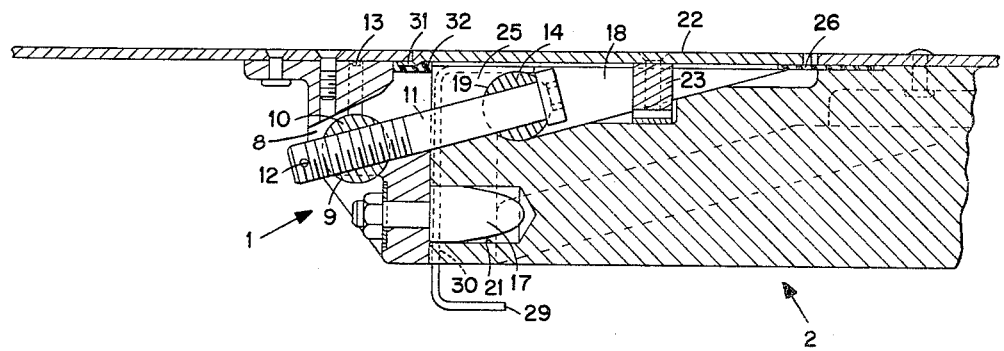
FIGURE 3 is a cross-sectional view taken on line 3—3 of FIGURE 1.
Figure 2:
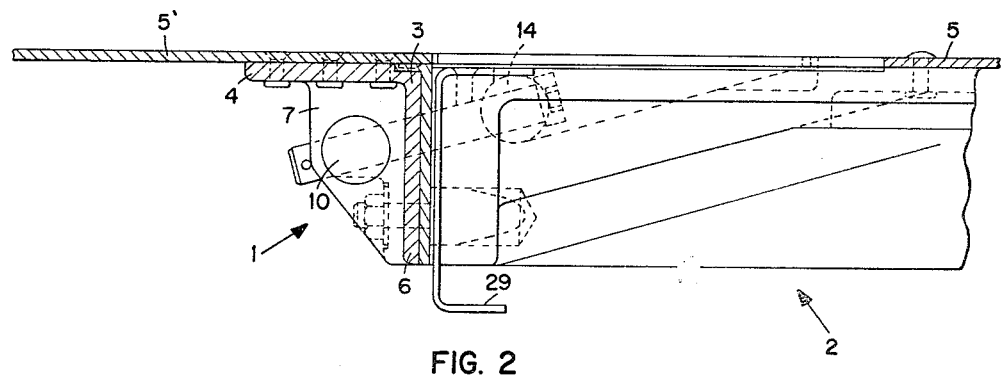
FIGURE 2 is a side elevation of the fastening device taken on line 2—2 of FIGURE 1.
Figure 4:
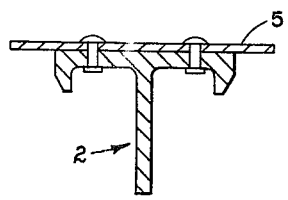
FIGURE 4 is a cross-sectional view taken on line 4—4 of FIGURE 1.
Figure 5:
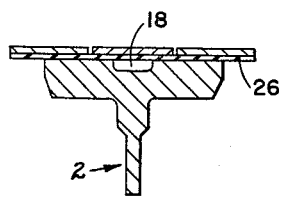
FIGURE 5 is a cross-sectional view taken on line 5—5 of FIGURE 1.

Referring now to FIGURES 2 and 3 it will be noted that this fastener or joint connector is comprised of a pair of connector blocks 1 and 2. Block 1 is a latch type assembly comprising a frame 3 with a base plate 4 riveted or otherwise secured to the inner surface of the outer skin 5' of a missile section. A brace plate 6, extending radially inwardly from the outer edge of base plate 4, affords the surface making contact with block 2 which is a keeper type block and may be riveted or otherwise secured to the inner surface of missile skin 5. Behind this plate is a body portion 7 which is integral with the base plate and the brace plate.

Reference is now directed to FIGURE 3 wherein a diagonal slot 8 and a groove 18 extend longitudinally of blocks 1 and 2, respectively, and slope from a maximum depth on the outer end of block 1 to a minimum on the upper surface of block 2. The slot and groove receive a latch bolt 11. Latch bolt 11 is illustrated as having a head for engagement with an Allen type wrench so that the head may fit closely in the groove of block 2. Apertured crossheads 10 and 14, respectively, are positioned one on each end of latch bolt 11 and are fitted in cylindrical transverse cavity 9 and in semi-cylindrical hook shaped cavity 19 located in blocks 1 and 2 respectively. The aperture of crosshead 10 is internally threaded for engagement with the threads of latch bolt 11. A pin spring 12 is inserted in a transverse hole at the threaded end of bolt 11 to prevent disassembly of the joint. A spring loaded plunger 13 is biased against the surface of crosshead 10 so as to resist turning movement thereof and thus retain the crosshead as well as the latch bolt in any desired position for assembly.

Immediately below the latch bolt there is provided a tapered guide lug 17 which is rigidly attached to block 1 by a bolt or other suitable means. The guide lug, best illustrated in FIGURE 3, is tapered and sized to fit into socket 21. The guide lug thus serves as a guide means during assembly of the joint and also prevents transverse relative movement between blocks 1 and 2 after assembly of the joint. In some instances fasteners of this type are subjected to extreme torsional and sheering stresses. When such extreme conditions exist it may be necessary to provide the device with a plurality of lugs 17.

Figure 1:
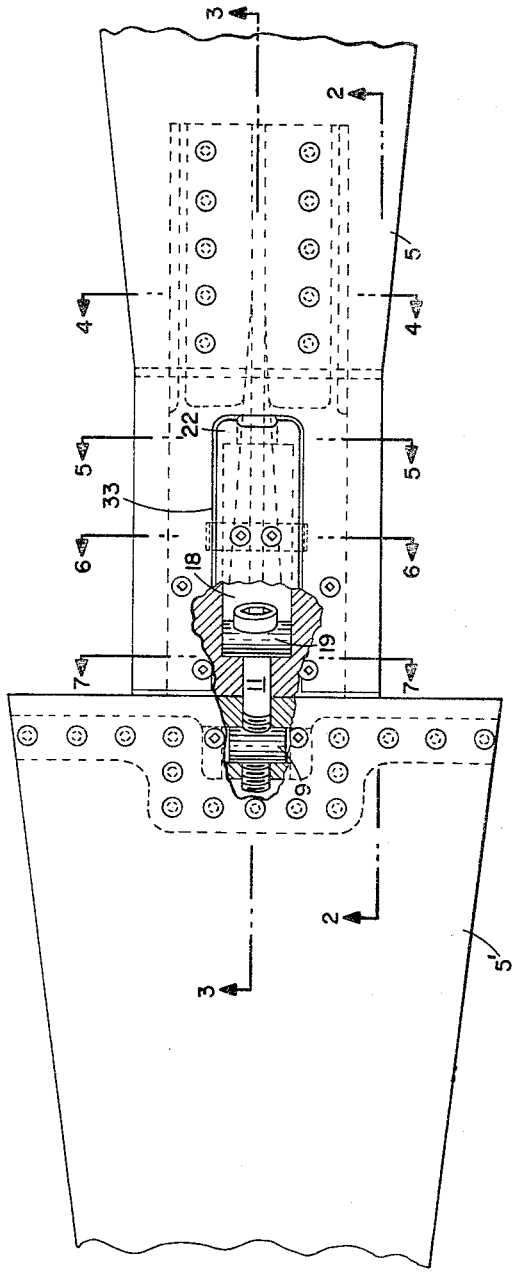
FIGURE 1 is a plan view partly broken away and illustrating the fastening device from the exterior of the missile.
Figure 6:
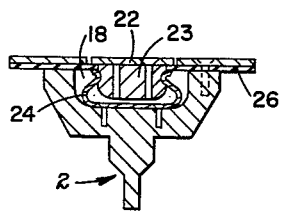
FIGURE 6 is a cross-sectional view taken on line 6—6 of FIGURE 1.
Figure 7:
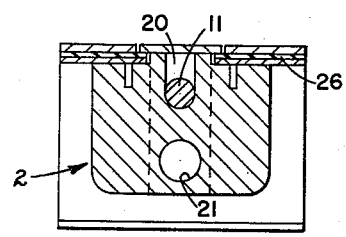
FIGURE 7 is a cross-sectional view taken on line 7—7 of FIGURE 1.

A bolt lock 29 is mounted between the blocks and is provided with an apertured portion for insertion of guide lug 17. The bolt lock is positioned in a recess 30 cut in the abutting face of block 2. After the two sections are assembled, the upper portion of lock 29 is bent over block 2 and engages a flat portion or slot (not shown) in the head of latch bolt 11 so as to positively prevent rotation of the bolt 11. A slot 33 (FIGURE 1) is provided in the missile skin for insertion of the bolt 11 and crosshead 14. A rectangular cover plate 22 is adapted to close slot 33 so as to cover and seal the fastener from the atmosphere outside the missile. Plate 22 is provided with a lip portion 31 at one end thereof which is inserted beneath missile skin 5, 5'. The plate is also provided with a retaining block 23 near its midportion. As best illustrated in FIGURE 6, retaining block 23 is adapted to be snapped into steel retaining spring 24 thereby firmly retaining the cover in place within opening 33.

A seal 26 is positioned between missile skin 5 and block 2. The seal extends radially inwardly so as to engage the inner edge portion of cover plate 22. A flap or overlapping portion 32 (FIGURE 3) of the seal is located beneath the missile skin so as to be tightly pressed between block 1 and lip portion 31 of the cover plate.

In operating the present device, latch bolt 11 is passed through apertured crosshead 14 and screwed into internally threaded crosshead 10 which is pivotally mounted in block 1. Then by pivotal movement of crosshead 10 bolt 11 is pivoted upwardly and outwardly to a position convenient for joining blocks 1 and 2 without contact between crosshead 14 and the elements of block 2, particularly hook portion 25. The bolt and crossheads are maintained in this position by the force of spring loaded plunger 13 on the surface of crosshead 10. Then with bolt lock 29 in place in recess 30, block 2 is brought into abutting engagement with block 1. Alignment between the components is accomplished by means of tapered guide lugs 17 as they engage sockets 21. After bringing blocks 1 and 2 into engagement crosshead 14 is dropped over hook portion 25 and drawn into cavity 19 by tightening latch bolt 11 with a suitable wrench (not shown). Bolt lock 29 is then bent over hook portion 25 and into engagement with the head of latch bolt 11 thereby preventing rotation of said bolt. Finally cover plate 22 is snapped in place and in combination with gasket 26 seals the opening 33 thereby concealing as well as protecting the fastener from the elements.

Although the preferred form of the embodying apparatus has been described in considerable detail in fully disclosing a practical application of the invention, it is understood that modifications of the apparatus may be utilized to advantage without departing from the spirit and scope of the invention as defined in the sub-joined claims.

We claim:

1. A fastening device including: a pair of connector blocks; one of said connector blocks including a base plate with means for securing said base plate to an outer missile skin, a brace plate integral with said base plate and extending radially inwardly and perpendicular to said base plate, said brace plate having a surface for making contact with the other block, a body portion between the brace plate and the base plate and integral with the base plate and the brace plate, a transverse cylindrical cavity in said one of said blocks, a diagonal slot in said one of said blocks extending longitudinally thereof across said transverse cylindrical cavity and from said surface through said block; the other of said blocks including a diagonal sloping groove that extends from one end thereof toward the other end with a maximum depth at said one end and opening through a surface of said other block, which surface is normal to a surface at said one end, said sloping groove having a portion that is narrower in width near said one end and defining a semi-cylindrical hook shaped cavity where said narrower one end portion joins with another wider portion of the diagonal sloping groove; and means securing said blocks together including a cylindrical crosshead having an internally threaded transverse aperture rotatably mounted in said cylindrical cavity, an apertured cylindrical crosshead engaged in said hook shaped cavity, and a bolt extending through the aperture in said apertured crosshead, said narrower portion of said groove, a portion of said slot to said internally threaded crosshead, threaded into the internally threaded crosshead, and clamping said blocks together, said diagonal slot having a depth such that said apertured cylindrical crosshead and bolt are adapted to be moved laterally as said threaded crosshead is rotated so that said one of said blocks may be cleared by said other block when said bolt is loosened relative to said threaded crosshead.

2. A fastening device as set forth in claim 1, wherein guide means is provided between said blocks, said guide means including a lug projecting from said one of said blocks and engaging a socket in said other of said blocks.

3. A fastening device as set forth in claim 1, wherein a cover plate is placed over the groove and a portion of said slot to conceal and protect said means securing said blocks together, a retaining block is mounted on said cover plate, and a retaining spring is secured within said groove to cooperate with said retaining block and secure said cover plate over said groove and said portion of said slot.

4. A fastening device as set forth in claim 1, wherein the internally threaded crosshead is biased against rotation by a spring loaded plunger located within a bore of said one of said connector blocks.

References Cited by the Examiner

UNITED STATES PATENTS

| 301,164 | 7/84 | Robson et al. | 16—140 |
| 990,681 | 4/11 | Strepey | 151—53 X |
| 1,922,753 | 8/33 | White | 16—140 |
| 2,393,519 | 1/46 | Crowther | 151—5 |
| 2,421,400 | 6/47 | Young | 20—69 |
| 2,710,214 | 6/55 | Summers | 292—247 |
| 2,714,032 | 7/55 | Summers | 292—247 |
| 2,990,650 | 7/61 | Attwood | 50—212 |

FOREIGN PATENTS

| 526,408 | 6/56 | Canada. |

FRANK L. ABBOTT, *Primary Examiner.*
RICHARD W. COOKE, Jr., *Examiner.*